United States Patent [19]

Coussot et al.

[11] 4,331,022

[45] May 25, 1982

[54] SENSOR USING TWO TUNABLE OSCILLATORS CONNECTED TO A FREQUENCY MIXER COMPRISING A DEVICE FOR CALIBRATING THE FREQUENCY OF THE OUTPUT SIGNAL AND A PROCESS FOR CALIBRATING THIS FREQUENCY

[75] Inventors: Gerard Coussot; Pierre Hartemann, both of Paris, France

[73] Assignee: Thomson-CSF, Paris, France

[21] Appl. No.: 173,013

[22] Filed: Jul. 28, 1980

[30] Foreign Application Priority Data

Jul. 27, 1979 [FR] France ................................ 79 19427

[51] Int. Cl.³ .................... G01L 25/00; G01L 7/08
[52] U.S. Cl. ......................................... 73/4 R; 73/703
[58] Field of Search .................... 73/654, 703, DIG. 4, 73/4 R; 310/313 A, 313 B, 313 C, 313 D

[56] References Cited

U.S. PATENT DOCUMENTS

| | | | |
|---|---|---|---|
| 4,100,811 | 7/1978 | Cullen et al. | 73/654 |
| 4,216,401 | 8/1980 | Wagner | 310/313 R |
| 4,265,124 | 5/1981 | Lim et al. | 73/703 |

Primary Examiner—S. Clement Swisher
Attorney, Agent, or Firm—Oblon, Fisher, Spivak, McClelland & Maier

[57] ABSTRACT

A sensor of the type comprising two delay lines forming part of two oscillators whose output signals are mixed and in particular a surface acoustic wave sensor comprising a wafer made from a piezoelectric material comprising a calibrating device for calibrating the output frequency constituted by an additional delay line formed by a metal strip inserted in the connections of one of the oscillators. By means of a laser beam indentations are formed in this metal strip, thus causing an increase in the delay for adjusting the frequency of the output signals of the sensor to a predetermined value.

7 Claims, 7 Drawing Figures

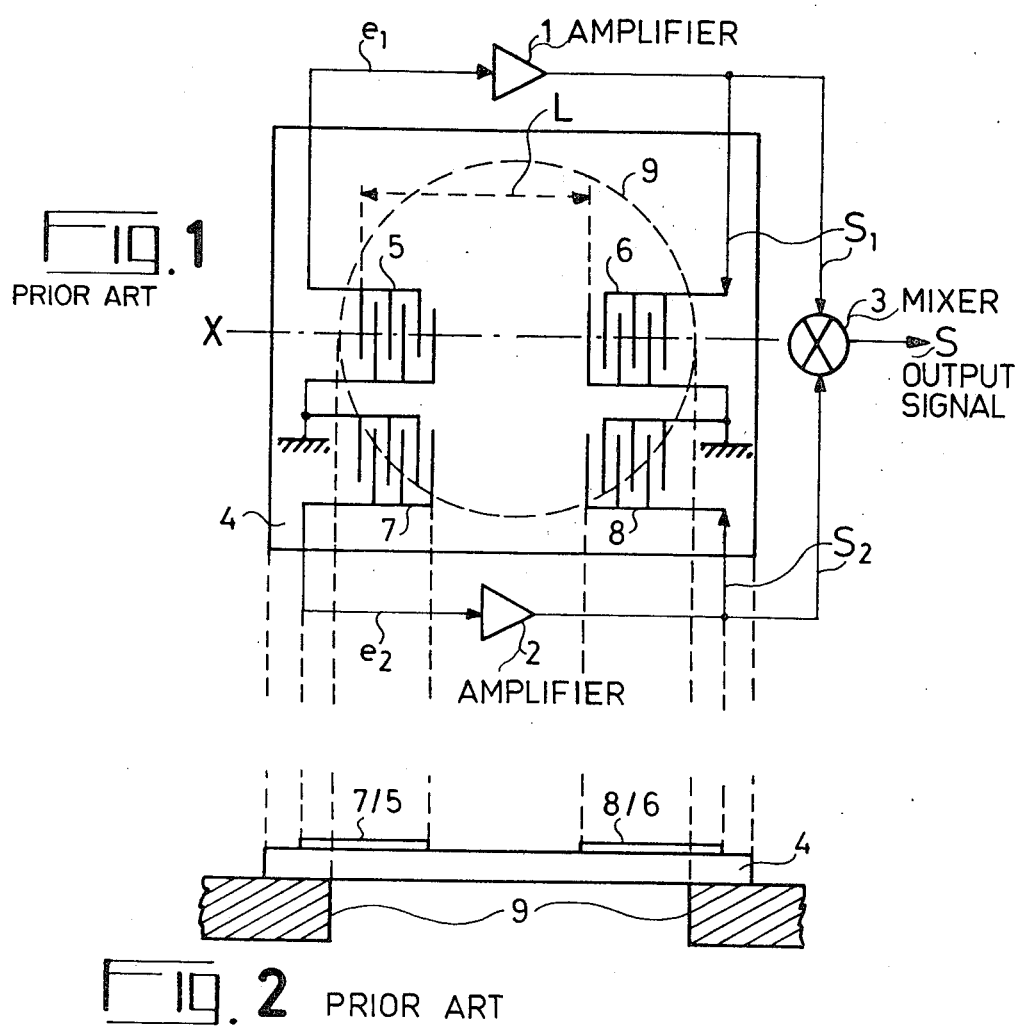

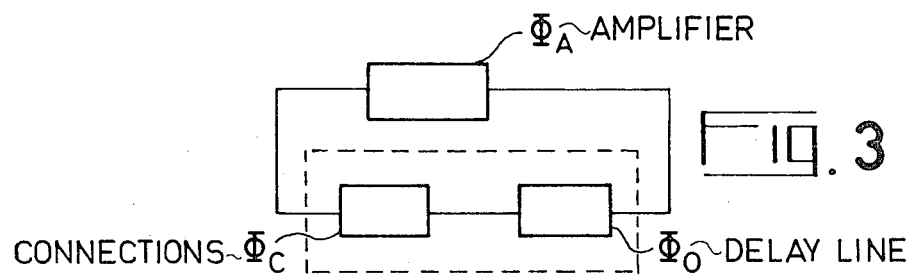
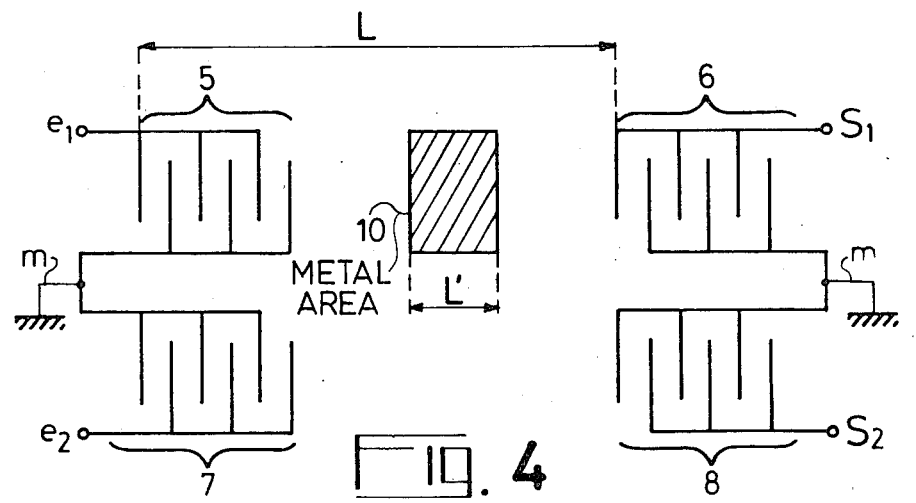
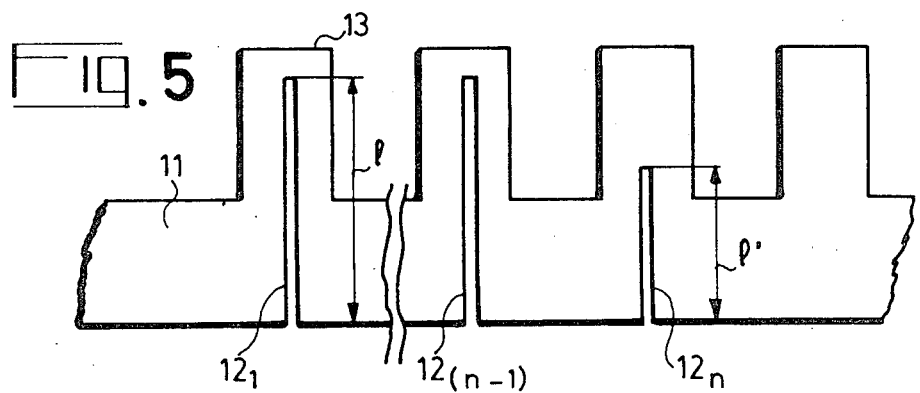

SENSOR USING TWO TUNABLE OSCILLATORS CONNECTED TO A FREQUENCY MIXER COMPRISING A DEVICE FOR CALIBRATING THE FREQUENCY OF THE OUTPUT SIGNAL AND A PROCESS FOR CALIBRATING THIS FREQUENCY

BACKGROUND OF THE INVENTION

The present invention relates to a sensor using two tunable oscillators connected to a frequency mixer and comprising a device for calibrating the frequency of the output signal and the process for calibrating this frequency.

The invention relates in particular to surface acoustic wave pressure gauges.

It is known to use the surface acoustic waves propagated between two transducers with interfitting electrodes in a piezoelectric substrate to measure accelerations, stresses or pressures exerted on a thin membrane contained in this substrate. To this end, the delay line formed between two transducers is relooped by means of an amplifier and forms an oscillator whose frequency varies depending on the variations of stress in the materials.

It is also known to associate two oscillators of this type, by implanting on the same membrane two delay lines and in combining the output frequencies of these two oscillators so that a variation in the stresses applied to the membrane produces frequency variations in the opposite direction. The output frequency of the pressure gauge thus formed is equal to the beat between these two frequencies. This process compensates in a large part particularly for the effect of temperature drifts, the temperature drifts causing variations in frequency of the same sign in both oscillators. A device of this type is described for example in U.S. Pat. No. 4,100,811.

For some types of application, it is necessary for the output frequency of the pressure gauge to be other than zero in the rest condition, i.e. in the absence of any stress. This is particularly the case for a type of pressure gauge used in the field of automobile electronics.

This pressure gauge allows depression measurements to be effected with respect to the atmospheric pressure and may in particular be used for controlling an internal combustion engine. The frequency of the two oscillators forming the pressure gauge (and so the output frequency of the pressure gauge which is the difference between these two frequencies) depends on a number of parameters, in particular on the nature of the crystal used, on the nature of the connections and on the characteristics of the electric circuits used.

For so-called general public applications, economic considerations impose the use of cheap elements. It follows that, for example, amplifiers forming the associated electronic circuits present dispersions in particular in their characteristic parameters. The direct result is that the value of the peak frequency in the rest condition is not obtained in a reproducible manner from one sample to the next.

SUMMARY OF THE INVENTION

To palliate these difficulties, the invention provides a pressure gauge having two delay lines comprising transducers, carried by a first face of a common support subjected to stresses in opposite directions; said delay lines being furthermore connected by connection circuits to appropriate electric circuits for forming two loops each constituting an oscillator producing signals, respectively at a first and at a second frequency, intended to be mixed so as to produce an output signal at a third frequency, said pressure gauge comprising further a calibrating device formed by at least one additional delay line adjustable by laser machining or by sandblasting, inserted in said connecting circuits of one of said oscillators.

The invention also provides a process for calibrating the frequency of the output signal of such a pressure gauge.

DESCRIPTION OF THE DRAWINGS

The invention will be better understood and other advantages will appear from the following description made with reference to the accompanying drawings in which:

FIGS. 1 and 2 illustrate one example of a pressure gauge according to the prior art;

FIG. 3 is the electric diagram equivalent to a surface acoustic wave oscillator;

FIG. 4 illustrates a first process for calibrating the output frequency of a pressure gauge;

FIG. 5 illustrates the process of the invention;

DESCRIPTION OF THE PREFERRED EMBODIMENTS

Figure 6:
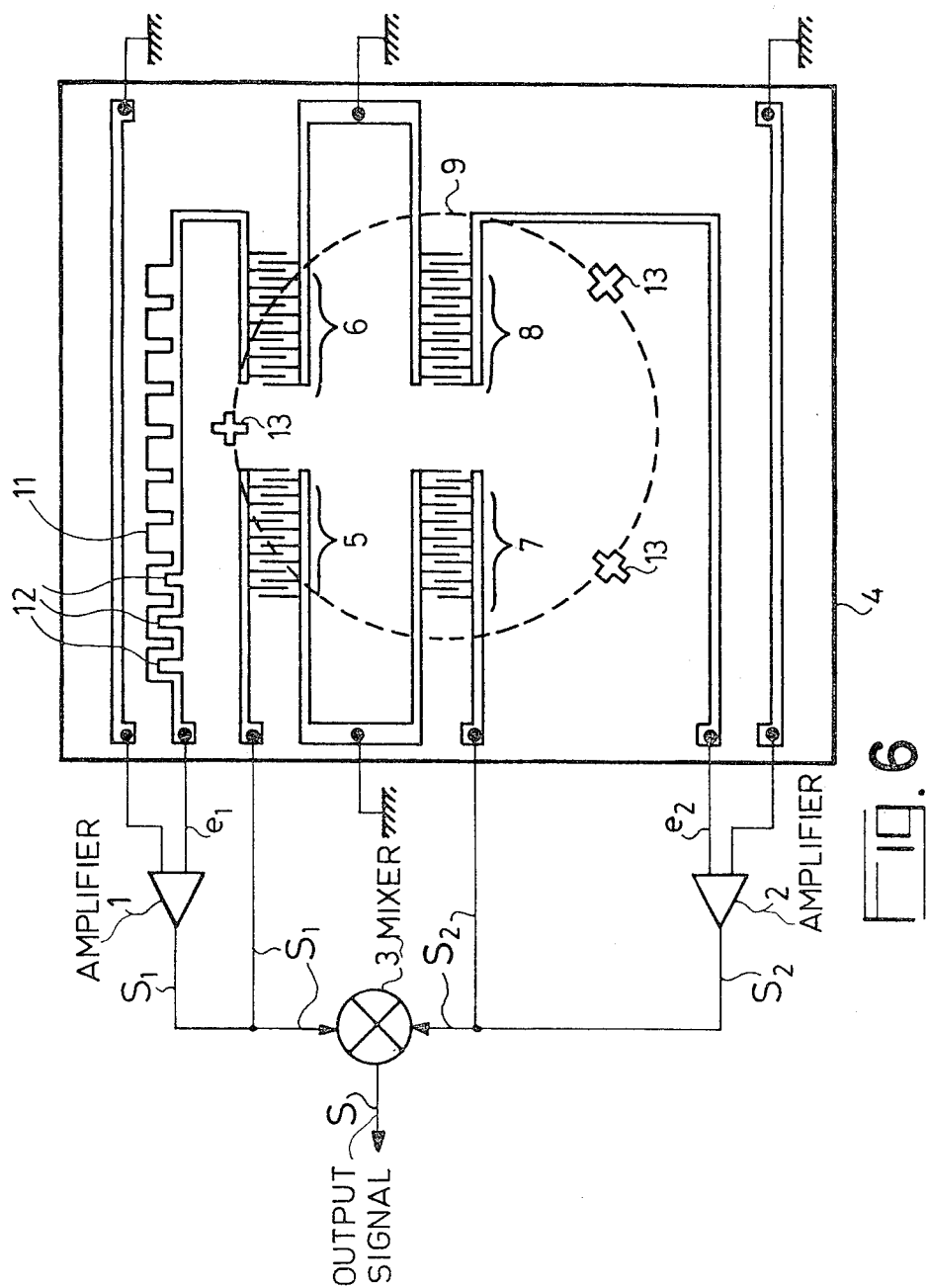
FIGS. 6 and 7 illustrate an acoustic wave pressure gauge comprising a device for calibrating in accordance with the process of the invention.

FIGS. 1 and 2 show respectively, in a top view and in section, a surface acoustic wave pressure gauge operating in accordance with the principle of a two-oscillator pressure gauge. This pressure gauge comprises a piezoelectric substrate, for example made from quartz, forming a wafer integral with a support 9. This support has a circular central recess the projection of which onto wafer 4 is shown in FIG. 1 by a broken line. The surface inside this circle forms the useful part of wafer 4. In this useful zone, are formed two delay lines, one with axis X passing through the center of the circle formed by two transducers 5 and 6 in the form of combs with interfitting teeth 5 and 6, the other formed by two additional transducers 7 and 8 disposed along an axis parallel to axis X and close to the periphery of the useful zone, so that the effects of a pressure difference between the two faces on the stresses imposed in the corresponding zones of the wafer so on the speed of propagation of the waves, are in opposite directions for the two lines. The oscillators are formed by relooping on themselves, on the one hand, transducers 5 and 6 and, on the other hand, transducers 7 and 8, respectively by means of amplifiers 1 and 2. The electric wiring is such that the frequencies $f_1$ of the signal present at the output $S_1$ and $f_2$ of the signal present at the output $S_2$ vary in opposite directions when the pressure difference between the upper and lower faces of wafer 4 varies. These frequencies are mixed by circuit 3 which supplies an output signal S, of frequency $f_S$ or beat frequency equal to the difference between frequencies: $f_1 - f_2$.

FIG. 3 is an electrical diagram equivalent to each oscillator.

For each of the oscillators, oscillation conditions are given by the relationship:

$$\phi_a + \phi_0 + \phi_c = 2\pi n \qquad (1)$$

In this relationship:

n is a whole number;

$\phi_O$ is the phase shift produced by the delay line;

$\phi_a$ is the phase shift produced by the amplifier (respectively 1 or 2);

$\phi_c$ is the phase shift produced by the connections (respectively $e_1/S_1$, $e_2/S_2$).

The relationship (1) may again be written:

$$\omega(t_O+\tau)+\phi_a=2\pi n \quad (2)$$

where:

$\tau$ is the travel time in the connections, $\phi_a$ is the phase shift introduced by the amplifier, $t_O$ is the travel time of the surface waves between the emitting transducer (5 or 7) and the receiving transducer (6 or 8) separated by a distance L. As is well-known, this distance L is equal to the distance separating two homologous teeth of the emitting (5 or 7) and receiving (6 or 8) transducers, $\omega$ is the pulsation.

This oscillation frequency is then equal to:

$$f = \frac{n - \phi_a/2\pi n}{t_0 + \tau} \quad (3)$$

After mixing in circuit 3, the output frequency or beat frequency depends then on the nature of the crystal, on the amplifier and on the form and nature of the connections.

Wafer 4 is cut from a piezoelectric crystal. The time required for propagation of a wave emitted by one of the emitting transducers (5 or 7) to reach the homologous receiving transducer (6 or 8) depends on the quality of the crystal used and on the positioning of the mask with respect to the crystallographic axes. For quartz, in an ST section, a relative speed variation of $10^{-4}$ for each angular degree of shift has been calculated. Which results in a variation of the frequency ($\Delta f/f$) not very different from $10^{-4} \cdot n$; where n is the number of degrees.

In the case of large-scale production, an error of orientation of about 2° is admitted which breaks down into about 1° of error due to the orientation of the wafer supplied and about 1° of error due to the positioning by the operator. This leads, for a typical value of the operating frequency of the oscillator equal to 100 MHz, to a variation $\Delta f$ of this frequency equal to about 20 kHz.

The travel time in the connections also comes into the definition of the oscillation frequency. This travel time depends on the nature of these connections, on their geometric configuration and on the interactions between these different connections and the transducers.

Finally, the frequency of the oscillation depends also on the phase shift introduced by the amplifier. This phase shift is related in particular to the gain of this amplifier. This latter is in general in module form comprising semiconductor components integrated on a chip or interconnected in the form of a hybrid circuit. These modules produced on a large scale present dispersions as to their characteristic parameters and in particular as to their inherent gain.

For a concrete embodiment, typical values of the oscillation frequency of each of the oscillators is of the order of 100 MHz. A beat frequency at rest of the order of 100 kHz is desirable. The reproducibility of this beat frequency must be established with an accuracy of the order of ±1%, whatever the causes of drift.

As was seen previously, the only errors due to the crystal are of the order of ±20 kHz not taking into account temperature drifts. The fact of using two oscillators allows the effect of these temperature drifts to be in part attenuated. Other arrangements, not within the scope of the present invention, may be adopted to reduce further the residual effects of the temperature drifts.

The average delay for a given geometry of pressure gauge is of the order of $t_O=1.6$ μs. Since the desired accuracy is ±1%, the beat frequency must be defined at ±1 KHz. Now, a variation of 1 KHz on the oscillation frequency leads to a delay variation: $\Delta t = t_O \cdot 10^{-5} = 0.016$ ns. To obtain reproducibility of the performances with the desired accuracy, it is then necessary for the difference in the delays between the two paths each formed by an oscillator, to be less than this value.

In what has gone before it has been assumed that the surface wave produced by the emitting transducer (5 or 7) freely propagates at the surface of the piezoelectric wafer 4 over a distance L. The propagation time is then given by the formula:

$$t_O = (L/V_{free}) \quad (4)$$

where $V_{free}$ is the speed of propagation of the wave at the surface of the substrate.

If there is deposited on the wafer, along the path of the wave, a metal area of length L', the speed of propagation is slowed down over this distance. The time required for the wave emitted to travel through this area is given by the formula:

$$t' = (L'/V_{metal}) \quad (5)$$

with $V_{metal} < V_{free}$ and $V_{metal}$ the speed of propagation in the metalized zone.

This slowing down is due to two effects creating an interaction between the wave and the propagation medium: short-circuit effect of the electric field and "charging" effect by the very mass of the metal area.

The time required for propagation with the delay introduced by the line becomes:

$$t'_0 = \frac{L - L'}{V_{free}} + \frac{L'}{V_{metal}} \quad (6)$$

The variation of the delay is:

$$\Delta T = t'_O - t_O \quad (7)$$

A first process for adjusting the output frequency $f_S = f_1 - f_2$ of the pressure gauge would consist in increasing the delay introduced by one of the paths, by disposing for this a metal area 10 between the transducers 5 and 6, as illustrated in FIG. 4, and in adjusting the length L' of this area by laser cutting, for example, until a correct frequency is obtained.

By way of non-limiting illustration, if L = L':

$$\Delta T = t_0 - t'_0 = \frac{L}{V_{metal} - V_{free}} \quad (8)$$

-continued $$\text{and } \frac{\Delta T}{T} = \frac{V_{metal}}{V_{metal} - V_{free}} \quad (9)$$

For quartz, in an ST section:

$$(\Delta T/T) = 2.10^{-4}$$

For $f_1 = 100$ MHz, the frequency variation $\Delta f_1$ obtained is: $\Delta f_1 = 20$ KHz, which is the order of size of the desired frequency corrections.

A second process would consist in suppressing by laser cutting a predetermined number of teeth of the combs forming the interfitting electrode transducers so as to modify the average distance L.

These simple approaches present however disadvantages:
 discontinuous adjustment by steps, at least for one of the approaches;
 local heating of the substrate causing modifications in the propagation conditions of the acoustic waves and additional drifting of the oscillation frequency.

These approaches do not then allow reproducibility of the desired beat frequency.

The invention proposes a process for calibrating the beat frequency based on the modification of the length of the paths in the connections disposed between the acoustic delay lines and the active electronic elements. The process of the invention will be described in relation to FIGS. 5 to 7.

For this, the connections of one of the paths of the pressure gauge, i.e. the relooping connections of one of the oscillators, will be given a configuration such that they introduce a pre-established additional delay. In the examples which have just been described, to obtain a variation of 1 KHz on the oscillation frequency, an additional delay $\Delta t_o = t_O \, 10^{-5}$ must be introduced, i.e. $\Delta t_O$ not very different from 0.016 ns. The difference in delays between the two paths must not then exceed this maximum value of 0.016 ns.

A conventional cable presents a delay of 5 ns per meter. A length of cable of about 3 mm is then required to obtain this value. The order of size is too small for accurate adjustment of the oscillation frequency by this method.

According to the invention, there is introduced into one of the relooping connections, for example as shown in FIG. 6, in connection $e_1$ an additional delay line calibrating device 11. This delay line is reduced to a metal strip having a predetermined geometrical structure and known under the name of "Microstrip".

The process of manufacturing and calibrating a pressure gauge in accordance with the invention comprises the following steps:

(1) Formation by metal deposition on a piezoelectric crystal wafer of the circuit comprising the two delay lines required for forming the oscillators of the surface acoustic wave pressure gauge. These lines comprise the interfitting electrode emitting transducers of the two paths: 5 and 7 as well as the interfitting electrode receiving transducers 6 and 8. In addition to the connection circuits or the usual connections, one of the paths is thrown out of balance by incorporation of the above-mentioned delay device 11. Apart from this device, the circuit formed during this step differs in no point from the prior art and the usual manufacturing processes may be used.

An example of such a circuit is illustrated in FIG. 6 and carries the reference 4. Reference marks 13 have been provided on wafer 4, allowing visual positioning thereof with respect to the orifice provided in support 9 (FIGS. 1 and 2). These delay lines are then connected to the associated electronic circuits: amplifiers 1 and 2 and mixer 3. A concrete embodiment will be described hereafter with reference to FIG. 7.

(2) Determination of the output frequency $f_S$ of the pressure gauge or beat frequency: for this, the module comprising these different components is, within the scope of an industrial embodiment, placed in a measuring bench supplying the module with electric power and comprising a frequency meter measuring the frequency of the signal present at output S. The dimensioning of the additional delay device 11 must be calculated so that the difference $f_S$ between the frequency $f_1$ and $f_2$ of the output signal $S_1$ and $S_2$ of the two oscillators is always greater than a predetermined minimum value $f_S$. By way of non-limiting example $f_1$ and $f_2$ are of the order respectively of 1 MHz and 1.1 MHz and so $f_S$ minimum > 100 KHz, with all cumulated dispersions. These measurements may be effected automatically or manually. The measuring procedures, well-known to the man skilled in the art, will not be described further.

(3) Calibrating the output frequency: indentations 12 are made in the metal deposit of the additional delay device 11 by means of a laser source or by sandblasting. These indentations tend to increase the delay introduced by device 11 and reduce the output frequency of the corresponding oscillator, and therefore the beat frequency $f_S$. FIG. 5 illustrates this method in more detail. Frequency $f_S$ of the output signal S or beat frequency is measured continuously and the cutting process continues until this frequency reaches the predetermined value, for example 100 KHz, this continuously. In fact, the length of the successive indentations is not limited to the maximum discrete value 1 (FIG. 5: $12_1$ to $12_{n-1}$) for each zone 13 of device 11 (coarse calibration). Any indentation of an intermediate length $l'$ may be effected (FIG. 5: $12_n$). The total cutting length is then in the general case $p1 + 1'$, (where p is the number of indentations of length 1), causing a proportional increase in the delay. This is a first advantage of the invention with respect the processes which have been previously outlined. Furthermore, the disturbance introduced in the piezoelectric substrate by heating is very localized, for it is limited to indentations $12_1$ to $12_n$ only situated outside the path traveled by the surface waves.

Finally, although the embodiment illustrated in FIG. 6 is particularly advantageous, the additional delay device 11 may be situated outside the substrate 4 on an additional wafer. This solution presents however disadvantages, among others of making the temperature drifts of the delay device 11 independent of those of the circuits of the principal wafer 4.

Examples of typical values of the characteristic parameters of delay device 11 are:
 length of metal strip: 9000 μm
 width of metal strip: 750 μm
 pitch of the indentations: 1000 μm.

As is well-known, the following materials: quartz or alumina may be used for constructing the piezoelectric wafer 4. The electrodes, the connecting conductors and the metal strip of device 11 may be formed from aluminium, silver or palladium.

Figure 7:
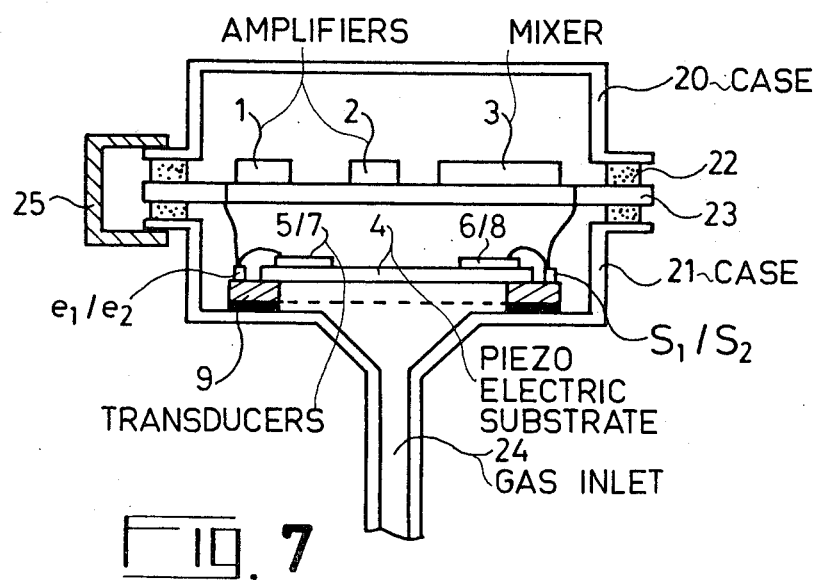

A concrete example of application of a pressure gauge in accordance with the invention will now be described with reference to FIG. 7 showing in section a pressure gauge used particularly in the field of automobile electronics, for controlling an internal combustion engine. The principle element of this pressure gauge is a piezoelectric wafer 4 calibrated in accordance with the process of the invention. The different elements of the pressure gauge are contained in an enclosure defined by two covers 20 and 21. The edges of wafer 4 are bonded to support 9 by means of a hard bonding agent, after positioning by means of reference marks 13. This support 9 is itself bonded by means of a flexible bonding agent to the base of cover 21. The space defined by cover 21, support 9 and wafer 4 communicates with an input channel for the fluids 24 whose pressure P, either absolute, or differential (with respect to the atmospheric pressure for example) it is desired to measure. Support 9 is fixed to cover 21 so as to obtain a perfect seal between the inside of the inlet channel 24 and the enclosure defined by the space between covers 21 and 20 above wafer 4.

The fluid is in contact with face 4 opposite the face carrying transducers 5/7 and 6/8 forming the delay lines such as described above. In the enclosure there is also placed a printed-circuit wafer 23 fixed by its ends between the flattened edges of covers 20 and 21. These latter are joined together by seals 22 and possibly other assembly means 25. The printed circuit 23 carries the different electronic circuits, for example amplifiers 1 and 2 and mixer circuit 3. This printed-circuit wafer is connected electrically to the input and output transducers by connections $e_1/e_2$ and $S_1/S_2$. The pressure reigning in the upper enclosure is for example $P_O$. The pressure difference $P-P_O$ causes deformation of the wafer in opposite directions for the two delay lines, causing frequency variations $\Delta f_1$ and $\Delta f_2$ of opposite signs. The output signal which is extracted from mixer 5 has then for frequency: $f_S+\Delta f_S=f_1+f_2+\Delta f_1-\Delta f_2$. This signal may be filtered so as to obtain the frequency $\Delta f_S=\Delta f_1-\Delta f_2$. Thus the pressure difference $P-P_O$ is determined.

The invention is not limited to the embodiments which have just been described. The piezoelectric wafer comprising the two delay lines and calibrated in accordance with the process of the invention may be used for other types of gauges and more generally for all devices comprising two oscillators having surface acoustic wave delay lines. These devices producing signals of a digital type may be associated with units for processing digital signals and for example with microprocessors.

The invention is not limited either to surface acoustic wave gauges alone, but relates to all gauges using two tunable oscillators comprising delay lines carried by a support and connected to a frequency mixer and particularly magneto-acoustic or magnetostatic wave gauges. Finally, two calibration devices in accordance with the invention may be used, placed respectively in the feedback loops of each of the oscillators, without departing from the scope of the invention.

What is claimed is:

1. A sensor of the type having two delay lines comprising transducers carried by a first face of a common support and subjected to stresses in opposite directions; said delay lines being furthermore connected by connection circuits to appropriate electric circuits so as to form two loops each constituting an oscillator producing signals, respectively at a first and a second frequency, intended to be mixed so as to produce an output signal at a third frequency, said sensor comprising a calibration device formed by at least one additional delay line adjustable by laser machining or by sandblasting, inserted in said connection circuits of one of said oscillators.

2. The sensor as claimed in claim 1, in which said additional delay line is formed by a metal strip carried by a support comprising evenly-spaced indentations so as to form a series of crenellated metal areas disposed along an axis parallel to the largest of the dimensions of said metal strip.

3. The sensor as claimed in claim 2, wherein said metal strip is further located on the first face of said common support.

4. The sensor as claimed in claim 1, wherein said transducers are electromechanical transducers with interfitting combs.

5. A process for calibrating the frequency of the output signal of a sensor as claimed in claim 2, wherein, with the frequency of the signal produced by said oscillator comprising the calibrating device being chosen greater by a predetermined value than the frequency of the signal produced by the second of said oscillators, the following steps are carried out:

continuous measurement of the value of the frequency of said output signal;

formation of at least one indentation by means of a laser source or by sandblasting, in said metal areas between two crenellations of said metal strip so as to increase the delay introduced by said additional delay line and to reduce proportionally the frequency of the signal produced by said oscillator comprising the additional delay line, until the frequency of said output signal reaches said predetermined value.

6. The process as claimed in claim 5, wherein each of the indentations made in said metal strip provide a zone of small width, extending from the edge of said metal strip, opposite the crenellated areas, over a predetermined length less than the width of said metal strip in a direction substantially orthogonal to the largest of the dimensions of this strip; the zone being entirely stripped of metal after cutting by said laser source or by said sandblasting.

7. The process as claimed in claim 6, wherein indentations are formed of a fixed length and equal to said predetermined length so as to achieve coarse calibration and an indentation of a variable length less than said predetermined length so as to achieve fine calibration.

* * * * *